July 22, 1941.  L. F. CARTER  2,249,744
GYRO VERTICAL
Filed March 5, 1938  3 Sheets-Sheet 1

INVENTOR
LESLIE F. CARTER
BY
Herbert H. Thompson
HIS ATTORNEY

July 22, 1941.  L. F. CARTER  2,249,744
GYRO VERTICAL
Filed March 5, 1938  3 Sheets-Sheet 2

INVENTOR
LESLIE F. CARTER
BY
HIS ATTORNEY

July 22, 1941.  L. F. CARTER  2,249,744
GYRO VERTICAL
Filed March 5, 1938   3 Sheets-Sheet 3

INVENTOR
LESLIE F. CARTER
BY
Herbert F. Thompson
HIS ATTORNEY

Patented July 22, 1941

2,249,744

UNITED STATES PATENT OFFICE 2,249,744

GYRO VERTICAL

Leslie F. Carter, Leonia, N. J., assignor to Sperry Gyroscope Company, Inc., Brooklyn, N. Y., a corporation of New York Application March 5, 1938, Serial No. 194,039

4 Claims. (Cl. 74—5)

This invention relates to the art of gyroscopic artificial horizons or gyro verticals, wherein the purpose is to maintain a truly horizontal plane or reference vertical regardless of acceleration forces due to turning and changes of speed of the vehicle on which the instrument is mounted. More particularly, the invention relates to improvements in the general type of gyroscopic horizon wherein the gyroscope is mounted in substantially neutral equilibrium, and a gravitationally responsive device or devices mounted thereon or associated therewith act to erect the gyroscope, upon relative inclination, by exerting a force substantially normal to the plane of tilt.

A common form of such instrument is shown in the patent to B. G. Carlson, #1,982,636, dated Dec. 4, 1934, wherein there is pivoted on the bottom of the gyroscope a plurality of small, light, pendulous blades which differentially cover airports in the bottom of the casing, the present practice being to balance the gyroscope about its trunnion supports with the auxiliary pendulums hanging free. Under the action of lateral acceleration forces, the auxiliary pendulums swing in the direction of the applied force and thus open a port and cause the gyro to slowly precess from the vertical in following the inclination of the control pendulums. If the force is strong, the pendulum will swing over until it strikes a stop, which results, in effect, in slightly lowering the center of gravity of the system since at that time the center of gravity of the auxiliary pendulum ceases to act at the pivotal point of support and is lowered to its true center of gravity.

According to the present invention, I propose to remedy both of these defects. First, I propose to cut off the erecting force during turns so that the gyro will not be disturbed at that time. When cutting off the erection force, however, I propose to leave the spinning torque on the gyro unaffected, since during long turns, if the spinning jets are interfered with, serious loss of speed of the rotor may result. To this end, I propose to provide two independent air supplies, one for spinning the rotor and the other for the erecting torque. I also propose to so mount and balance the auxiliary pendulums that at the time the acceleration force is acting, the gyro will be in true equilibrium, since this is the period during which it is most important that the gyro should be in equilibrium.

One method of accomplishing this is by balancing the gyroscope about its gimbal support with the pendulums locked to the gyro or, in other words, under the same conditions that would arise during the action of an acceleration force. While this results in making the gyro slightly anti-pendulous, that is, top-heavy when the auxiliary pendulums are hanging free, this has no detrimental effect since the erection forces are well able to maintain the gyro erect regardless of this slight unbalance.

Another method of accomplishing this is to pivot the auxiliary pendulum or pendulums in the same horizontal plane as the trunnion axis of the gyro, since whatever torque is exerted by the pendulum when displaced by the action of acceleration forces is rendered ineffective by the fact that it has no lever arm.

Referring to the drawings, showing several forms my invention may assume,

Fig. 4 is a diagrammatic view showing how the erecting device may be cut off automatically from a turn indicator.

Fig. 5 is a horizontal section taken substantially on line 5—5 of Fig. 2, with the pendulums omitted.

Figure 1:
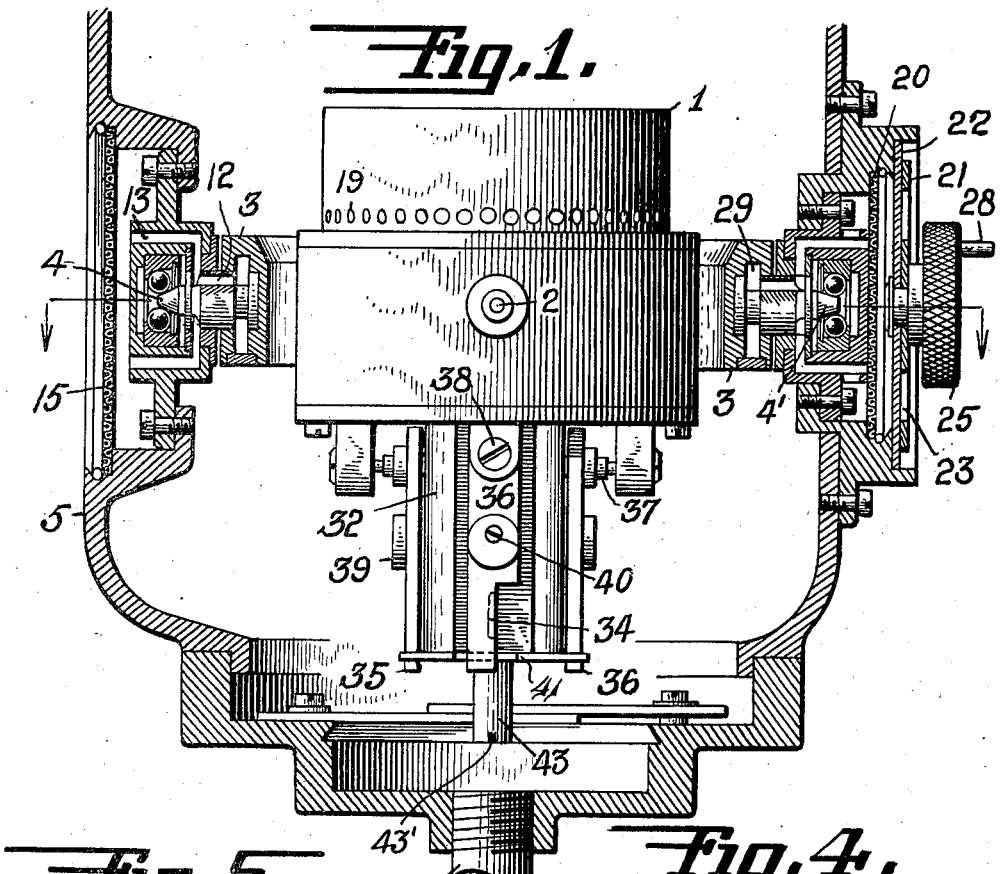
Fig. 1 is a side elevation, partly in section, of the form of gyro vertical using four auxiliary pendulums as the gravitational controller.

The gyroscope is shown as enclosed within a rotor bearing casing 1 which is universally gimbaled by being trunnioned in horizontal trunnions, 2, 2' in a gimbal ring 3 which, in turn, is trunnioned in horizontal trunnions 4, 4', normal to trunnions 2, 2', in the outer supporting frame 5. The rotor 6 is shown as journaled within the casing 1 by means of normally vertical rotor bearings 7, 7'.

The rotor is shown as of the air-spun type, being driven by one or more air jets 8, 8' within the casing 1 which receive air from a channel 9 in said casing, which is connected with passage for apertures 10 extending through the trunnion 2 and into a channel 11 within the gimbal ring 3. The channel 11, in turn, communicates with passages 12 through trunnion 4 and thence leads without the casing through channels 13. The instrument is shown as of the vacuum driven type, air being continuously exhausted from the casing 5 through pipe 14 and a portion of the air enters through a screen 15 and through channels 13.

Instead of allowing the air used to spin the rotor to pass downwardly into the extension 32 to erect the gyroscope, I discharge this air upwardly through holes 16 in the casing. In order to prevent any torques being exerted by the discharge air, I preferably pass this air through baffle material, such as loose cotton 17, and discharge it through a plurality of apertures 18 and 19 directed upwardly, and possibly laterally, in symmetrical fashion.

For supplying the erecting device with air, I provide a separate intake screen 20 which is provided with a shut-off device 21. This may be in the shape of a pair of superimposed discs 21 and 22, each provided with a plurality of apertures 23 and 24. When said apertures are in line, air may flow freely in through the screen 20, but when the disc 21 is turned in the position shown in Figs. 1 and 4, the intake air is shut off. The disc may be conveniently turned from a knob 25 which may be adjusted by hand during turns or change of speed, or it may be operated automatically from a turn detecting device such as a gyroscopic turn indicator 26 (Fig. 4), which is shown as connected by a link 27 to a pin 28 on knob 25 in Fig. 4, so that precession of the gyro in either direction will close the intake ports 23—24.

It should be noted that the shut-off valve thus provided is mounted in a fixed part secured to casing or frame 5, and not on the sensitive gyroscope or gimbal ring, so that the valve may be readily turned on and off by hand through knob 25, or automatically, without disturbing the gyroscope. Said valve is therefore located at the entrance to the several channels leading through the gimbal ring supporting the hollow gimbal and the rotor bearing casing supported in the gimbal.

The air, after passing through the screen, enters the gimbal ring 3 through the hollow trunnion 4'. Thence it passes around the gimbal through a channel 29 and through hollow trunnion 2' and into a channel 30 in the rotor bearing casing. Thence it passes downwardly through channel 31 and into the hollow extension 32 on the bottom of the casing. Said extension may be provided with the usual two pairs of opposed ports 33 and 34, adjacent to which are mounted the gravitational members in the form of small pendulums 35 and 36 pivoted on shafts 37 and 38 above the ports. The balance and hang of each pendulum may be independently adjusted by small eccentric masses 39 adjustably secured thereto by set screws 40, the position being slightly shifted to change the hang and balance of each pendulum. In the normal position, the pendulums preferably just close all four ports so as to use a minimum amount of air. Upon tilt of the gyro in a counter-clockwise direction in the plane of Fig. 1, for instance, the port 34 would be uncovered slightly, leaving the opposite port covered, and thus exerting a torque on the gyro at right angles to the tilt.

When the knob 25 is turned by hand, the adjustment may not only be changed during turns, but at any time it is desired to change the rate of erection, since obviously by varying the amount of opening of the ports 24, the rate of flow of the air through the erecting ports may be varied at will. Even when the knob is being adjusted by the turn gyro 26, it is obvious that the flow will not always be shut off during a slow turn, under such circumstances the rate of flow being merely diminished rather than entirely stopped.

A stop plate 41 is provided for the bottom of each pendulum which is struck by outward swing of the pendulum an amount just sufficient to open wide the adjacent port, and no more. This prevents the pendulum from swinging out very far and results in the pendulum acting as a rigid part of the casing as soon as the stop is engaged. This has the advantage that the affected pendulums strike a stop and thus lower the center of gravity practically at the start of a turn, to thus cause the gyro to become neutrally balanced at that time. Under the conditions assumed, the other pair of pendulums, the pivotal axis of which is in line with the acceleration force, cannot swing and therefore act as a rigid part of the case. In general, therefore, it may be stated that one pair of pendulums always has to be considered as a pendulous mass because it cannot swing if the gyro tilts in the plane of their pivotal axis, and the other pair also becomes a pendulous mass as soon as the stop is reached, which occurs under all ordinary lateral acceleration forces.

Therefore, in the balancing operation pursued in manufacturing the gyroscope, the gyro is preferably balanced with the pendulums locked to the casing, for instance, by means of a rubber band, so that the gyro will be balanced under the action of lateral acceleration forces. Although this results in making the gyro very slightly top-heavy when all pendulums are hanging normally, the erection force is sufficient to counteract any disturbing effect from this condition. The balancing operation is assisted by means of a mass 42 threaded on a rotatable stem 43 within the hollow extension 32, the stem being rotated by means such as a screw driver inserted in slot 43' so as to adjust the height of the mass.

It is obvious that, if desired, the ports 23 and 24 need not be entirely closed during the turn, but may be left slightly open so as to retain enough erecting force to counteract any unbalance of the gyro.

Figure 2:
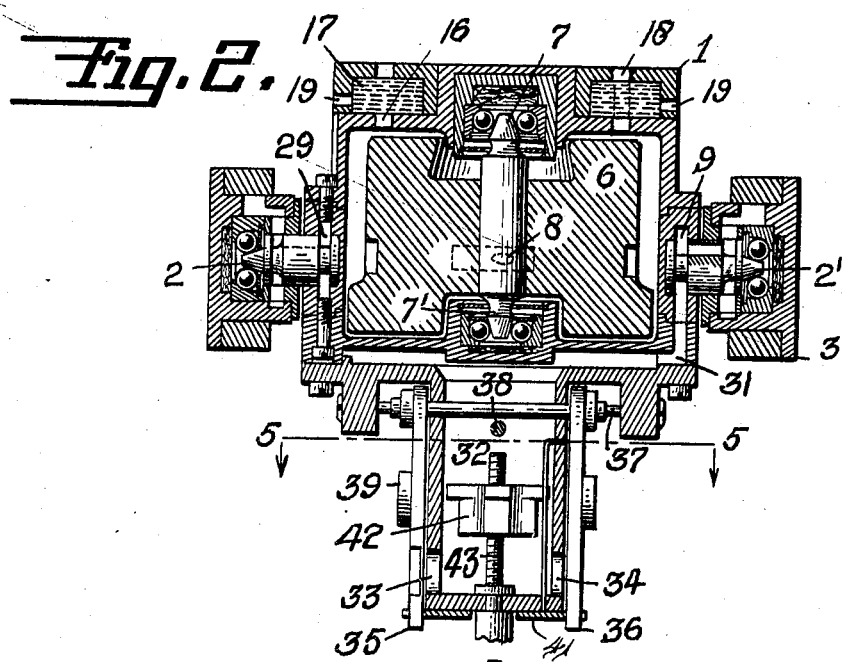
Fig. 2 is a vertical section through the gyroscope casing and rotor, taken at right angles to Fig. 1.
Figure 3:
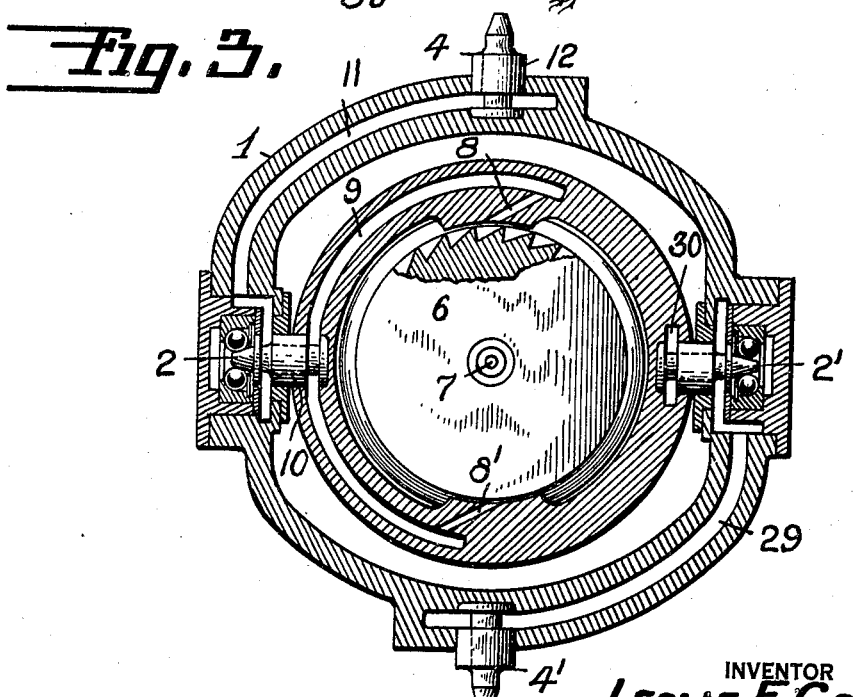
Fig. 3 is a horizontal section taken through the gimbal ring pivots.
Figure 6:
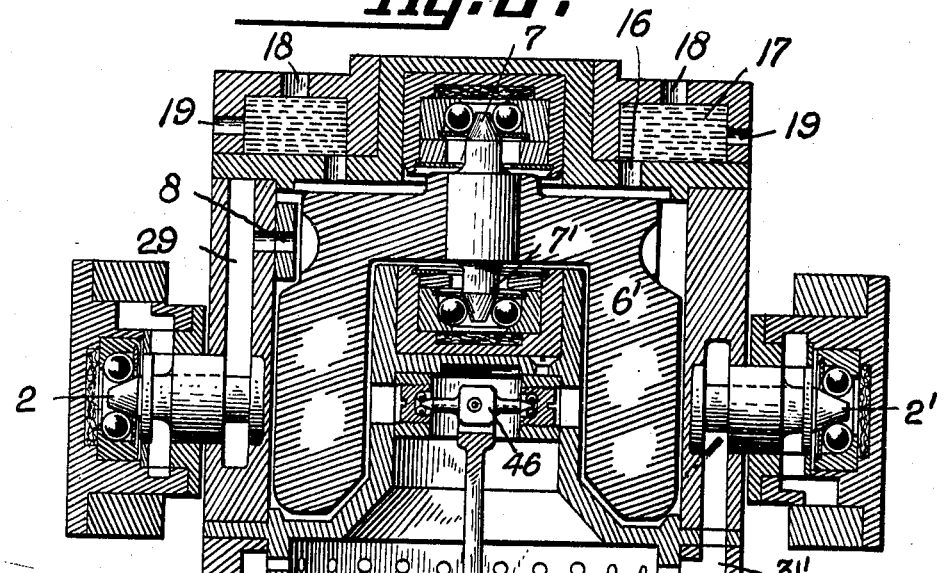
Fig. 6 is a vertical section of a gyroscope, showing a modified form of the invention.
Figures 7, 8:
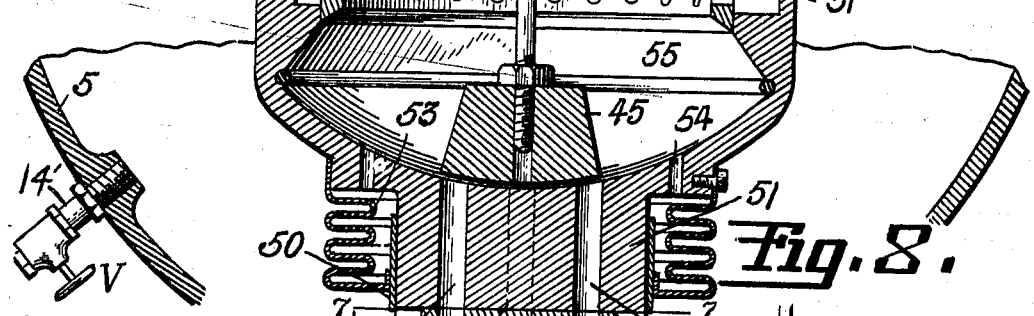
Fig. 7 is a horizontal section taken on line 7—7 of Fig. 6, looking in the direction of the arrows.
Fig. 8 is a sectional detail showing a still further modification.

While the same general principles of operation are retained in the form of the invention shown in Figs. 6 and 7, a change is made in the type and method of mounting of the gravitational controller.

Where similar, the parts are similarly numbered to Figs. 1, 2 and 3, so that a detailed description of this figure is omitted.

In this case, the gravitational controller is in the form of a single pendulum 45 which is universally mounted by universal pivot 46 in the same horizontal plane as the main trunnions 2, 2', 4, 4' of the gyro and in the vertical center line of the gyroscope. By this means a minimum of disturbing action is exerted on the gyro when the pendulum is displaced, mainly because the pendulum 45 is universally mounted so that it can swing in any plane and therefore does not act as a fixed mass on the gyroscope, no matter in which direction the lateral acceleration force acts and, in addition, because the lateral forces thereon have no lever arm about any axis. In this form, close stops are unnecessary and in fact are not desirable, the pendulum being permitted to swing within the limits of the enclosing casing.

The erecting air escapes downwardly through one of vertical channels 47, 47', 48, 48' and passes laterally through the connected channel 49 in the bottom plate 51 so as to emerge through ports 56, 56' at right angles to the plane of the relative tilt of the pendulum and gyroscope.

In this form, instead of shutting off the intake air to the erecting ports, the erecting ports are closed or spoiled. According to one modification, a sleeve 50 is slidably mounted on an extension 51 from the bottom of the gyro case, said sleeve being united with a flexible or expansible container 53, such as a Sylphon, the interior of which is connected through ports 54 with the interior 55 of the bottom of the gyro casing. The Sylphon is therefore exposed to the pressure of the air within the casing. The pressure is normally insufficient to force the Sylphon downwardly far enough to shut off the ports 56, but when the pressure rises beyond the normal pressure, the Sylphon is forced downwardly, causing the sleeve 50 to close the ports 56. In the preferred form sleeve 50 is cut away on two sides so that only the ports 56 which lie athwartships are cut off during turns, the others 56' being unaffected, since their pendulums are not affected at this time. (Arrow A in Fig. 7 indicates the airplane's fore and aft line.)

In this form of the invention, means are provided to greatly increase the relative air pressure supplied through the channel 31' to the chamber 55 (as compared to the pressure in the casing 5) during turns to cause the Sylphon to operate. Since independent channels are provided for leading air to the rotor and to the erection device, it is easy, if necessary, to effect this purpose without changing the rotor speed. However, an increase in the rotor speed during turns is not harmful and therefore I have merely shown a means for varying the negative pressure supplied by the pump to increase the relative air pressure within the chamber 55 during turns.

Figure 9:
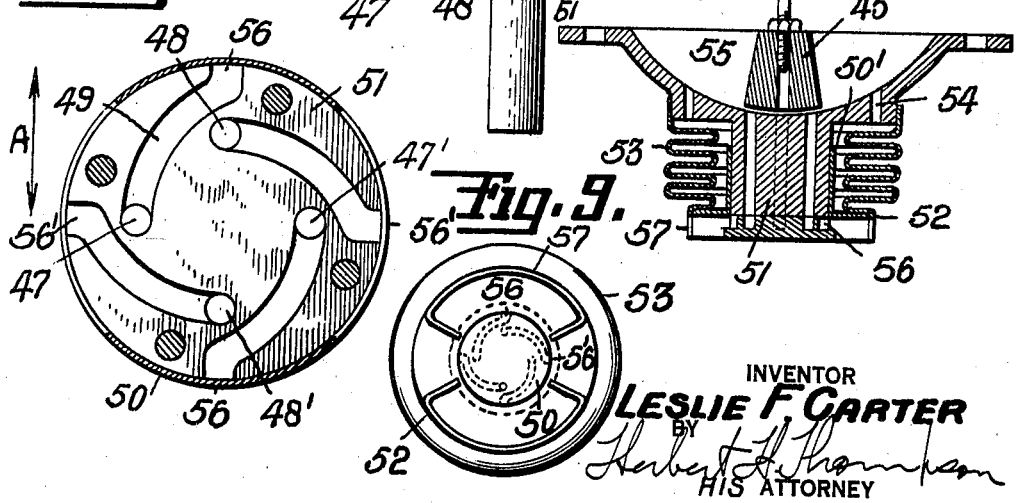
Fig. 9 is a bottom view of the bottom portion of the parts shown in Fig. 8.

Instead of having the sleeve cut off the ports 56, it may simply spoil the air discharge therefrom as shown in Figs. 8 and 9, illustrating a still further modification. In Fig. 8 the Sylphon 53 is shown in the expanded position, the sleeve 50' having an outwardly bent portion 52 at the bottom thereof having a downwardly turned rim 57. Preferably said rim is cut away or bent inwardly opposite ports 56' so as not to interfere with the discharge of air from the ports 56', as in Fig. 7. The discharge of air from ports 56, however, strikes the rim 57 and is hence deflected downwardly so that most, if not all, of the lateral reaction thereof is destroyed, thereby cutting out the erecting force around the transverse axis during turns.

In the form of the invention shown in Figs. 6 to 9, the turn indicating gyro 26, instead of being connected to the shutter at the intake, would be connected to a throttle valve V between the pipe 14' and the vacuum pump. Said valve could be normally partially closed but, when turning, would be opened wide by hand or by means of a turn indicator gyroscope, so that the vacuum would be increased at that time. This would decrease the pressure in the outside casing 5 and hence increase the relative pressure inside of the bowl 55, thereby resulting in expansion of the Sylphon 53. Obviously, this could also be applied to a pressure system, in which case a throttle valve at the pump would be operated as before, by a turn indicator or by hand, to give a maximum pressure when turning. In either case, it should be noted, not only is the discharge of air from the ports 56 (Figs. 6, 7 and 8) either stopped or rendered ineffective, but also the discharge of air through the other ports 56' is actually increased during a turn. Since the latter are not affected by acceleration forces of the turn, this effect rather improves the operation of the gyroscope than otherwise, since it tends to compensate for the loss of erection force from the other two ports.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a gyro vertical, a universally suspended gyroscope mounted in substantially neutral equilibrium, and a plurality of small pendulums pivoted thereon to control, by the relative inclination of the same and the gyroscope, a source of power to cause erection, each pendulum having a mass eccentrically pivoted thereon and means whereby said mass may be locked in the desired position.

2. In an air erected gyro vertical, a universally mounted rotor bearing casing, a plurality of differently facing ports therein for discharging air from the casing, a pendulum pivoted on said casing above each port, a mass eccentrically pivoted thereon, and means whereby said mass may be locked in the desired position.

3. In an air spun, air erected gyroscope, a rotor and rotor bearing casing, an air actuated erection device on said casing, a gimbal ring in which said casing is pivotally mounted, a supporting frame in which said ring is pivotally mounted, channel means for leading air in through the pivotal mountings of both said ring and casing and through said ring to within said casing to spin the rotor, separate channel means for leading in air through both said pivotal mountings and ring to within said casing for actuating said erection device, separate discharge ports for each air supply, and baffle means at the discharge ports from the rotor for preventing disturbing torques from the discharged air.

4. In an air spun, air erected gyroscope, a rotor bearing casing, a gimbal ring in which said casing is pivotally mounted, a supporting frame in which said ring is pivotally mounted, channel means for leading air in through the pivotal mountings of the ring and casing to within said casing to spin the rotor, separate channel means for leading in air through the pivotal mountings of the ring and casing to within said casing for erecting the gyroscope, separate discharge ports for each air supply, a valve in the erection channel means before said channel enters said gimbal mounting, and manual means for adjusting said valve to cut out or lessen the erecting force at will.

LESLIE F. CARTER.